July 2, 1974     L. MERKER     3,822,338
METHOD OF PREPARING MASSIVE MONOCRYSTALLINE YLTRIUM TITANATE
Filed Oct. 12, 1972
Light Transmission Curves – Yttrium Titanate ($Y_2Ti_2O_7$)
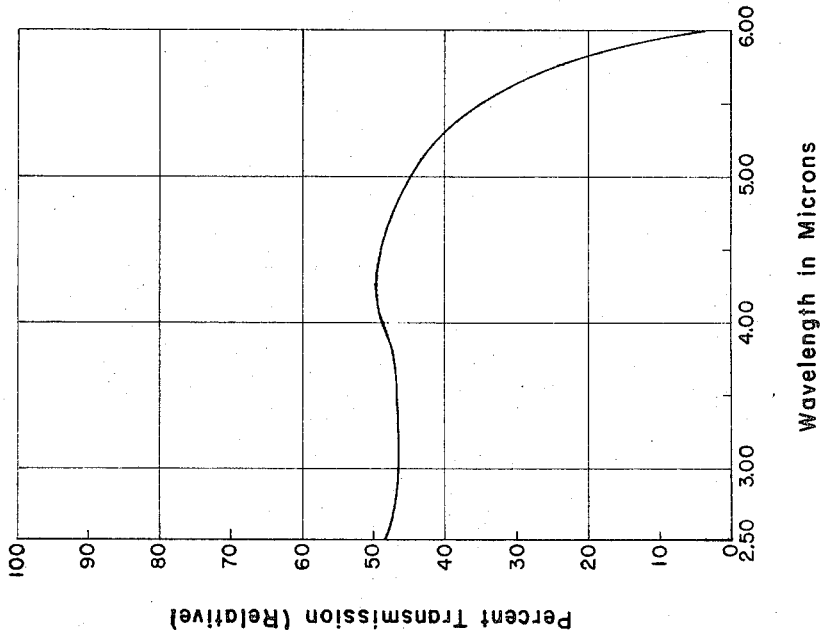
Fig. 2. (Infrared Light Range)
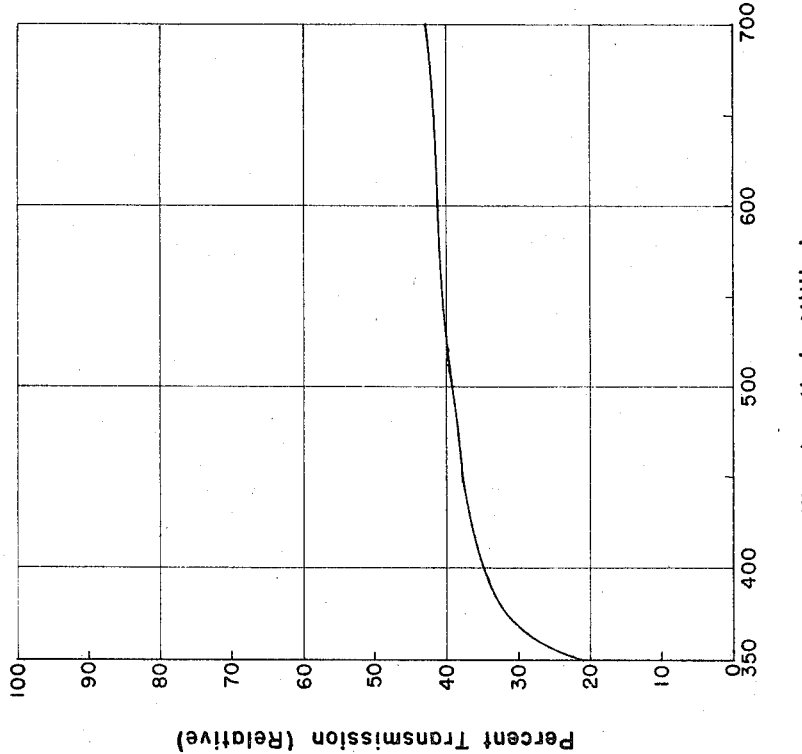
Fig. 1. (Visible Light Range)

United States Patent Office 3,822,338
Patented July 2, 1974

3,822,338
METHOD OF PREPARING MASSIVE MONOCRYS-
TALLINE YTTRIUM TITANATE
Leon Merker, Metuchen, N.J., assignor to N L
Industries, Inc., New York, N.Y.
Filed Oct. 12, 1972, Ser. No. 296,879
Int. Cl. C01f 17/00
U.S. Cl. 423—263                                    2 Claims

ABSTRACT OF THE DISCLOSURE

A massive, boule-shaped, single crystal of yttrium titanate is prepared by flame fusion of a finely divided yttrium titanate composition the bulk size of the single crystal boule so formed being such as to permit fabrication of optical elements such as lenses and prisms therefrom, and/or gem stones.

BACKGROUND OF INVENTION

For many years colorless, monocrystalline strontium titanate has been produced commercially as a source material for optical elements and gem stones. One of the requisites of optical materials for the maufacture of lenses and prisms is a high index of refraction. High dispersion qualities are also important. The single crystals of strontium titanate currently being produced by a modification of the Verneuil flame fusion process are substantially water-white and characterized by index of refraction and dispersion superior to those of flint or crown glass. Moreover, because of its high index of refraction (about 2.4) and high dispersion (.108) gem stones cut from strontium titanate boules have brilliance and fire comparable to that of diamond. However, strontium titanate single crystals do not compare in hardness to diamond. Following development of the monocrystalline strontium titanate boule efforts to improve its hardness or to develop other titanates having qualities comparable to strontium titanate but of superior hardness have been fruitless; and while there are reports in the literature of needle-like crystals of yttrium titanate being grown by heating $NaYTiO_4$ at 1500° C. in air, prior to the present invention there has been no monocrystalline yttrium titanate material produced of sufficient mass and/or bulk-size to constitute source materials for useful articles in industry.

SUMMARY OF INVENTION

The present invention relates to the discovery of a new, massive, boule-like single crystal of yttrium titanate prepared by flame fusion of yttrium titanate composition. These boule-like single crystals of yttrium titanate are of cubic symmetry and sufficient bulk-size to permit cutting lenses and prisms therefrom as well as gem stones. Moreover, the refractive index and dispersion of yttrium titanate are such that lenses and prisms formed therefrom are ideally suited for optical purposes.

Another possible use may be a base material for lasers when doped with suitable rare earth ions.

Further, single crystals of yttrium titanate have been found to have a Mohs hardness which is greater than that of strontium titanate and hence monocrystalline yttrium titanate has wider applications of usefulness both in industry and as gem stones.

In brief, the instant invention contemplates a new article of manufacture comprising a monocrystalline mass of yttrium titanate having a bulk-size sufficient to constitute source material from which to form industrially useful optical lenses and prisms as well as gen stones for the jewlery trade; and a method for producing same by flame fusion of a finely divided, free flowing, yttrium titanate feed material of the general formula $Y_2Ti_2O_7$.

DESCRIPTION OF DRAWING

The drawing shows two light transmission curves for a lens of yttrium titanate, FIG. 1 showing the relative percent light transmission in the visible range i.e. 400 to 700 millicrons wavelength; and FIG. 2, the percent relative transmission in the infrared region i.e. from 2.5 to 6.0 microns wavelength.

PREFERRED EMBODIMENT OF THE INVENTION

The term "yttrium titanate" as used herein will be understood to include compositions defined by the above formula and to embrace both pure and substantially pure titanates the substantially pure yttrium titanates being those containing impurities or coloring or modifying agents either present or added which are of a nature and in amounts so as not to effect, adversely, the monocrystalline structure of the yttrium titanate boule produced. In most cases, the impurities or modifying agents will not exceed a few tenths of a percent.

According to the instant invention massive monocrystalline yttrium titanate boules are prepared by co-fusing finely divided particles of a yttrium titanate composition of the general formula $Y_2Ti_2O_7$. These yttrium titanate compositions melt at temperatures of about 1950° C., and accordingly co-fusion, or flame fusion as it is sometimes called, is effected preferably in an oxygen-hydrogen burner in order to obtain the necessary high temperatures, the finely divided yttrium titanate being fed by gravity, or otherwise, onto a base or pedestal in an area of intense heat within the burner. Within this area the yttrium titanate melts and when cooled under carefully controlled conditions builds up a a single crystal on the pedestal. To initiate the formation of the single crystal it is desirable to first crystallize a small pool of molten yttrium titanate on the base or pedestal to form a seed crystal and then gradually increase the amount of molten material on the top of the seed crystal so formed. Such a procedure allows the crystal to build up upon itself gradually increasing in diameter until a massive, carrot-shaped single crystal boule of yttrium titanate is formed. It has been found that the temperature of the intensely heated area within the burner should be maintained somewhat above the melting point of the yttrium titanate but should not exceed a temperature at which the molten material tends to volatilize or to flow down over the edges of the pool of molten material being formed at the top of the boule. The temperature may be maintained at the desired level by adjusting the quantities and rates of flow of both the hydrogen and oxygen. Moreover, by controlling the size and position of the orifices of the oxygen-hydrogen burner it is possible to increase the size of the intensely heated area within which the boule is grown and hence to grow boules of relatively large diameter.

While substantially any type of combustible gases and most any design of burner may be utilized, provided sufficient temperature is maintained over the concentrated area within which the crystal is formed, a preferred type of burner is a modified Verneuil burner such as shown in U.S. Pat. No. 2,792,287.

It is preferred to employ a yttrium titanate feed material which is substantially free from objectionable or incompatible impurities which could detrimentally affect the crystal structure. Moreover, the feed material should be finely divided, free flowing and of uniform particle size.

One method for making a suitable feed material is by co-calcination of the respective oxides of yttrium and titanium. The powdery material so formed is substantially on composition i.e. represented by the formula $Y_2Ti_2O_7$, and is sufficiently free flowing to be fed substantially uniformly to the heating zone of the burner.

Yttrium titanate boules formed by flame fusion of feed material having the composition $Y_2Ti_2O_7$ were tested for their physical and optical properties. These are listed below together with those of strontium titanate for comparative purposes:

| Properties | $Y_2Ti_2O_7$ | $SrTiO_3$ |
|---|---|---|
| Color | (1) | (1) |
| Symmetry | (2) | (2) |
| Index of refraction | 2.29 | 2.4 |
| Hardness (mohs) | 7.4 | 6.5 |
| Melting point (° C.) | 1,950 | 2,060 |
| Spec. gravity | 4.98 | 5.13 |

1 Water-white.
2 Cubic.

Moreover, as shown in the drawing the light transmission curve of yttrium titanate, in the visible light range, has a relative percent transmission in the range from 35 to 40.5 with no high or low points in the curve thus establishing the usefulness of a yttrium titanate lens for optical purposes; while the transmission curve in the infrared region shows relatively high percentages in the wavelength region from 2.5 to 5.0 microns thus suggesting the usefulness of a yttrium titanate lens or prism in heat-sensor applications.

The following examples will serve to further illustrate the invention.

EXAMPLE 1

Using a yttrium titanate feed material prepared by the co-calcination of the oxides of yttrium and titanium a number of yttrium titanate boules were grown using the following procedure.

To modified Verneuil burner of the type described in U.S. Pat. No. 2,792,287, in which the flow rates of the oxygen and hydrogen gases were substantially equal at 14,000 cc. per minute, was fed a finely divided, free flowing, yttrium titanate feed material having the composition $Y_2Ti_2O_7$. The temperature within the burner was about 1950° C. A carrot-shaped monocrystalline mass of yttrium titanate approximately 3 cm. long and 1.0 cm. in diameter (at its widest point) was formed in about 3 hours of 30 carat weight. The boule was treated to remove strains in the crystal lattice by annealing at temperature from 1000–1500° C.

The monocrystalline yttrium titanate boule so formed possessed a clear, transparent, substantially colorless or water-white appearance and when tested had an index of refraction of 2.29 and a Mohs hardness of 7.4. The boule was subsequently cut to form a gem stone which excelled a diamond in brilliance and exceeded the hardness of strontium titanate by substantially one whole unit of magnitude.

EXAMPLE 2

By way of comparision a boule was prepared from strontium titanate feed material using the same burner as that used in Example 1. The feed rate of the oxygen was 14,000 cc./per minute, the hydrogen was 18,000 cc. per minute. The temperature in the burner was about 2060° C. A boule having a maximum diameter of 2.5 cm. was grown in 3 hrs. When tested for index of refraction and hardness its refractive index was 2.4 and hardness on the Mohs scale was 6.5.

The invention may be carried out in other specific ways than those herein set forth without departing from the spirit and essential characteristics of the invention and the present embodiment is therefore to be considered as illustrative and not restrictive, and all changes coming within the meaning and equivalency range of the appended claims are intended to be embraced therein.

What is claimed is:

1. Method for forming a massive monocrystalline clear, transparent boule-shaped body of yttrium titanate by flame fusion comprising: calcining a mixture of the oxides of yttrium and titanium to form a feed material comprising finely divided particles of an yttrium titanate composition having the general formula $Y_2Ti_2O_7$, burning a mixture of oxygen and hydrogen to form a flame having a temperature in the range 1950–2060° C. feeding said yttrium titanate composition onto a base in the presence of said flame to melt but not to volatilize said composition, controlling the cooling of and the continued formation of the melt to fuse the composition into a single crystal boule of yttrium titanate and thereafter annealing said boule by heating to a temperature in the range from 1000–1500° C.

2. Method for forming a massive monocrystalline boule-shaped body of fused yttrium titanate according to Claim 1 wherein cooling of the melt is controlled first to crystallize a small pool of molten yttrium titanate on the base to form a seed crystal and thereafter supplying amounts of molten composition on top of the seed crystal while cooling until a single crystal boule of fused yttrium titanate is formed.

References Cited

UNITED STATES PATENTS

| | | | |
|---|---|---|---|
| 2,812,234 | 11/1957 | Robinson | 423—263 |
| 2,767,050 | 10/1956 | Merker (1) | 423—598 |
| 2,628,156 | 2/1953 | Merker et al. | 423—598 |
| 2,936,216 | 5/1960 | Merker (2) | 423—598 |
| 2,942,941 | 6/1960 | Merker (3) | 423—598 |
| 3,677,718 | 7/1972 | Lawless | 423—598 X |

OTHER REFERENCES

Becker, "Zeitschrift fur Kristallographie, Bd. 131, 1970, pp. 278–288.

HERBERT T. CARTER, Primary Examiner

U.S. Cl. X.R.

423—598; 23—301 SP, 273 V, 305; 106—42; 252—301.4

UNITED STATES PATENT OFFICE
CERTIFICATE OF CORRECTION

Patent No. 3822338                           Dated July 2, 1974

Inventor(s) Lean Merker

It is certified that error appears in the above-identified patent and that said Letters Patent are hereby corrected as shown below:

In title of drawing "YLTRIUM" has been changed to YTTRIUM.

In title of invention col. 1 "YTTRIIUM" changed to YTTRIUM.

Col. 1 line 69 "gen" changed to gem.

Signed and sealed this 3rd day of December 1974.

(SEAL)
Attest:

McCOY M. GIBSON JR.                C. MARSHALL DANN
Attesting Officer                  Commissioner of Patents